United States Patent
Zhang et al.

(10) Patent No.: US 9,587,103 B2
(45) Date of Patent: *Mar. 7, 2017

(54) FORMALDEHYDE-FREE PROTEIN-CONTAINING BINDER COMPOSITIONS

(71) Applicant: JOHNS MANVILLE, Denver, CO (US)

(72) Inventors: Mingfu Zhang, Highlands Ranch, CO (US); Kiarash Alavi Shooshtari, Littleton, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/168,458

(22) Filed: Jan. 30, 2014

(65) Prior Publication Data

US 2015/0031259 A1 Jan. 29, 2015

Related U.S. Application Data

(62) Division of application No. 12/697,968, filed on Feb. 1, 2010, now Pat. No. 8,680,224.

(51) Int. Cl.
*C09J 189/00* (2006.01)
*C09J 133/02* (2006.01)
(Continued)

(52) U.S. Cl.
CPC ............ *C08L 35/06* (2013.01); *C08H 99/00* (2013.01); *C08J 5/24* (2013.01); *C09J 133/02* (2013.01);
(Continued)

(58) Field of Classification Search
None
See application file for complete search history.

(56) References Cited

U.S. PATENT DOCUMENTS

| 4,090,013 A | * 5/1978 | Ganslaw | ............... A61K 8/731 |
| | | | 260/DIG. 47 |
| 5,895,804 A | 4/1999 | Lee et al. | |

(Continued)

FOREIGN PATENT DOCUMENTS

| AU | 666 848 B1 | 8/1992 |
| EP | 2 100 922 A1 | 9/2009 |

(Continued)

OTHER PUBLICATIONS

The Dictionary of Chemistry, pp. 126-127 and 454-455, 1986.*

*Primary Examiner* — Peter A Salamon
(74) *Attorney, Agent, or Firm* — Robert D. Touslee

(57) ABSTRACT

One-part binder compositions are described that may include a protein and a crosslinking combination. The crosslinking combination may include at least a first crosslinking compound and a second crosslinking compound. The first and second crosslinking compounds are individually crosslinkable with each other and with the protein. Examples of the protein include soy protein. Fiber products and methods of making the fiber products are also described. The fiber products may include organic fibers, inorganic fibers, or both, in a cured thermoset binder based on solutions of the one-part binder compositions.

20 Claims, 1 Drawing Sheet

US 9,587,103 B2
Page 2

(51) Int. Cl.
*C08L 89/00* (2006.01)
*C08L 35/06* (2006.01)
*C08H 99/00* (2010.01)
*C08J 5/24* (2006.01)
*D04H 1/587* (2012.01)
*C08K 5/00* (2006.01)
*C08K 7/02* (2006.01)
*C08K 7/14* (2006.01)
*C08L 33/02* (2006.01)

(52) U.S. Cl.
CPC ............ *C09J 189/00* (2013.01); *D04H 1/587* (2013.01); *C08J 2389/00* (2013.01); *C08K 5/0025* (2013.01); *C08K 7/02* (2013.01); *C08K 7/14* (2013.01); *C08L 33/02* (2013.01); *C08L 89/00* (2013.01); *C08L 2205/16* (2013.01); *Y10T 428/253* (2015.01); *Y10T 428/2933* (2015.01); *Y10T 442/20* (2015.04); *Y10T 442/2992* (2015.04)

(56) References Cited

U.S. PATENT DOCUMENTS

| | | | | |
|---|---|---|---|---|
| 6,040,409 A * | 3/2000 | Lau | ............................ | C08F 2/22 526/317.1 |
| 6,518,387 B2 | 2/2003 | Kuo et al. | | |
| 6,780,422 B2 * | 8/2004 | Brieva | ...................... | A61K 8/25 424/401 |
| 7,282,117 B2 | 10/2007 | Vijayendran et al. | | |
| 7,345,136 B2 | 3/2008 | Wescott et al. | | |
| 7,416,598 B2 | 8/2008 | Sun et al. | | |
| 8,142,563 B2 * | 3/2012 | Kelly | ...................... | C09J 189/00 106/162.1 |
| 8,232,334 B2 * | 7/2012 | Kelly | .................. | C08B 37/0006 524/14 |
| 8,299,153 B2 * | 10/2012 | Kelly | ...................... | C08L 33/02 427/385.5 |
| 8,299,174 B2 * | 10/2012 | Brady | .................. | C03C 25/321 428/393 |
| 8,680,224 B2 * | 3/2014 | Zhang | .................. | C08H 99/00 427/385.5 |
| 8,809,477 B2 * | 8/2014 | Zhang | ...................... | C08H 1/00 527/200 |
| 8,937,025 B2 * | 1/2015 | Zhang | .................. | C08H 99/00 442/327 |
| 2004/0007156 A1 | 1/2004 | Thames et al. | | |
| 2005/0070186 A1 * | 3/2005 | Shoemake | .................. | C08J 5/04 442/176 |
| 2005/0070635 A1 | 3/2005 | Breyer et al. | | |
| 2005/0234156 A1 | 10/2005 | Thames et al. | | |
| 2006/0231968 A1 | 10/2006 | Cowan et al. | | |
| 2006/0234077 A1 | 10/2006 | Breyer et al. | | |
| 2007/0036975 A1 | 2/2007 | Miele et al. | | |
| 2007/0292618 A1 | 12/2007 | Srinivasan et al. | | |
| 2008/0021187 A1 * | 1/2008 | Wescott | ............ | C09J 123/0853 527/301 |
| 2008/0051539 A1 * | 2/2008 | Kelly | .................. | C09D 133/08 526/199 |
| 2008/0287635 A1 | 11/2008 | Sun et al. | | |
| 2009/0169867 A1 * | 7/2009 | Kelly | ...................... | C08L 89/00 428/326 |
| 2009/0170978 A1 * | 7/2009 | Kelly | ........................ | C08L 3/02 524/9 |
| 2009/0232953 A1 * | 9/2009 | Kelly | ...................... | C09J 189/00 426/550 |
| 2009/0258042 A1 * | 10/2009 | Anastasiou | ............... | A61K 8/11 424/401 |
| 2010/0089287 A1 | 4/2010 | Thames et al. | | |
| 2010/0129640 A1 * | 5/2010 | Kelly | ...................... | C08J 7/047 428/323 |
| 2010/0222459 A1 * | 9/2010 | Kelly | ........................ | C08L 5/00 524/17 |
| 2010/0222463 A1 * | 9/2010 | Brady | .................. | C03C 25/321 524/56 |
| 2011/0033671 A1 | 2/2011 | Govang et al. | | |
| 2015/0031259 A1 * | 1/2015 | Zhang | .................. | C08H 99/00 442/180 |

FOREIGN PATENT DOCUMENTS

| | | |
|---|---|---|
| WO | 2009079580 A1 | 6/2009 |
| WO | WO2010/003054 A1 | 1/2010 |

* cited by examiner

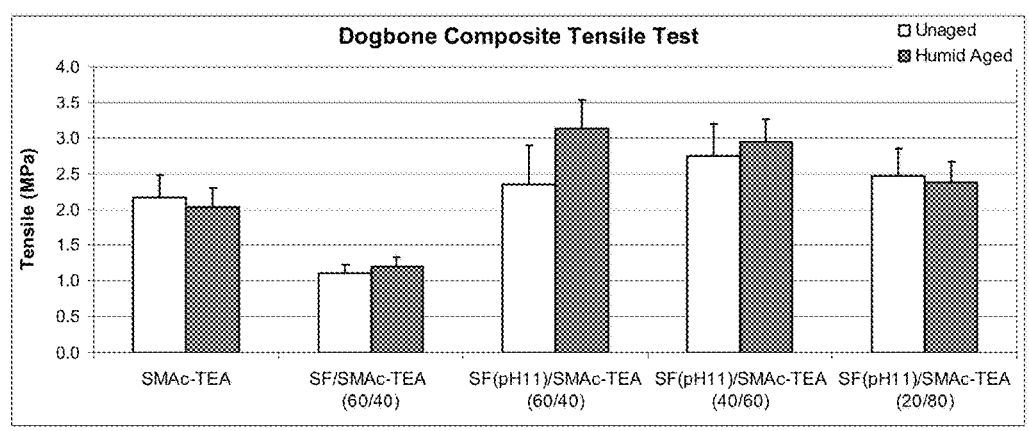

FORMALDEHYDE-FREE PROTEIN-CONTAINING BINDER COMPOSITIONS

BACKGROUND OF THE INVENTION

Thermoset binders for composite fiber products such as fiberglass insulation are moving away from traditional formaldehyde-based compositions. Formaldehyde is considered a probable human carcinogen, as well as an irritant and allergen, and its use is increasingly restricted in building products, textiles, upholstery, and other materials. In response, binder compositions have been developed that do not use formaldehyde or decompose to generate formaldehyde.

One type of these formaldehyde-free binder compositions rely on esterification reactions between carboxylic acid groups in polycarboxy polymers and hydroxyl groups in alcohols. Water is the main byproduct of these covalently crosslinked esters, which makes these binders more environmentally benign, as compared to traditional formaldehyde-based binders. However, these formaldehyde-free binder compositions also make extensive use of non-renewable, petroleum-based ingredients. Thus, there is a need for formaldehyde-free binder compositions that rely less on petroleum-based ingredients.

As an abundant and renewable material, protein has great potential to be an alternative to petroleum-based binders. Proteins are already used extensively as a component of adhesives for various substrates. However, many types of protein-containing adhesives have poor gluing strength and water resistance. Thus, there is a need to improve the bonding strength and water resistance of protein-containing binder compositions to levels that are similar to or better than those of conventional, petroleum-based binder compositions. These and other issues are addressed in the present Application.

BRIEF SUMMARY OF THE INVENTION

One-part binder compositions are described that may include one or more proteins that actively crosslink with other binder constituents to provide a rigid thermoset binder. The binder compositions are formaldehyde-free, and incorporate renewable materials like proteins from animal and vegetable sources (e.g., soy flour) that reduce or even eliminate the need for petroleum-based binder ingredients. The components of the binder compositions may be selected to increase the pot life and reusability of pre-cured binder solutions without compromising on the quality of the cured binder product.

The binder compositions may include one-part compositions that can be cured without the addition of another compound. However, additional compounds such as a cure catalyst may optionally be added to accelerate the rate of curing or some other function. In addition, changes in temperature and/or other external conditions may be effected to cure the binder composition and produce a final product containing the cured binder.

Exemplary binder compositions may include at least three components that are all capable of forming covalent bonds with each other. These components may include at least one protein and a crosslinking combination of two or more crosslinking compounds. The crosslinking compounds may include a first crosslinking compound (e.g., a polymer compound) and a second crosslinking compound (e.g., a crosslinking agent) that are individually crosslinkable with each other and with the protein. For example the binder composition may include a protein, polymer compound and crosslinking agent that all have functional groups capable of forming covalent bonds with each other. The protein may include hydroxyl and carboxyl groups that can form covalent bonds with complementary carboxyl and hydroxyl groups on the polymer compound and crosslinking agent. Similarly, the polymer compound and crosslinking agent are selected with complementary functional groups to form covalent bonds with each other (e.g., a polycarboxy polymer and hydroxyl-group containing crosslinking agent such as an amino alcohol). When all three groups are capable of forming covalent bonds with each other, the covalent bonding density in the cured binder may be higher than in binders where only two components form such bonds.

The increased covalent bond density in a binder system with three or more covalently bonding compounds may also allow the selection of more stable compounds for a one-part binder composition. For example, proteins, polymer compounds, and/or crosslinking agents may be selected that undergo covalent crosslinking reactions at a slower rate (e.g., a reaction rate that is about zero) under ambient conditions (e.g., room temperature), thereby extending the pot life (a.k.a. shelf life) of the one-part binder composition. The stability of the individual compounds may be selected to give the one-part binder composition a pot life about 1 month or more.

Embodiments of the invention include one-part thermoset binder compositions that may include a protein and a crosslinking combination of two or more crosslinking compounds. The crosslinking combination may include a first crosslinking compound and a second crosslinking compound, where the first and second crosslinking compounds are individually crosslinkable with each other and with the protein. One specific, non-limiting example of the present binder compositions includes a polymer compound; a crosslinking agent crosslinkable with the polymer compound; and a protein that is crosslinkable with both the polymer compound and the crosslinking agent. The protein may include soy protein which may, for example, be sourced from soy flour.

Embodiments of the invention may further include fiber products. The fiber products may include inorganic or organic fibers (or both) and a cured thermoset binder prepared from a one-part binder solution. The binder solution may include a protein and a crosslinking combination of two or more crosslinking compounds, where the protein and crosslinking compounds are all crosslinkable with each other.

Embodiments of the invention may still further include methods of making a fiber product. The methods may include the steps of providing fibers that may be organic fibers or inorganic fibers, and applying a one-part binder solution to the fibers. The one-part binder solution may include a protein and a crosslinking combination of two or more crosslinking compounds, where the protein and crosslinking compounds are all crosslinkable with each other. The methods may further include reusing an unused portion of the one-part binder solution in a subsequent application of the one-part binder solution to the same fibers or a different group of fibers.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

FIG. 1 is a graph of dogbone composite tensile tests for a selection of binder compositions described in the Examples below.

DETAILED DESCRIPTION OF THE INVENTION

One-part binder compositions are described that include renewable materials such as proteins in combination with two or more other binder components. Examples include one-part binder compositions made from at least one protein and a crosslinking combination of two or more crosslinking compounds, where the protein and crosslinking compounds are all crosslinkable with each other. The term "crosslinkable" refers to the ability of two compounds to form covalent bonds with each other, although other type of bonds may also be formed between the compounds. The one-part binder composition may optionally include additional components such as cure catalysts.

Binder solutions made from the present binder compositions may be applied to a substrate such as inorganic and/or organic fibers and cured to make a composite of the thermoset binder and substrate such as a building material (e.g., fiberglass insulation). These materials do not off-gas formaldehyde during their production and use, or decompose to contaminate factories, buildings, homes, and other areas with formaldehyde. Furthermore, the binder compositions may at least partially substitute renewable compounds (e.g., proteins) for non-renewable compounds such as petroleum-based compounds.

Exemplary Binder Compositions

Exemplary binder compositions may include compositions containing at least one protein and a crosslinking combination of two or more crosslinking compounds, where the protein and crosslinking compounds are all crosslinkable with each other. The proteins used in the binder compositions may include vegetable and/or animal proteins. These proteins may be readily available from a renewable source. Examples of proteins that may be used in the binder compositions include soy protein, wheat protein, corn protein, whey, albumin, keratin, gelatin, collagen, gluten, casein, among other kinds of proteins.

The proteins may be used in an unmodified, un-denatured state (i.e., native proteins). Alternatively, the proteins may be modified and/or denatured using physical, chemical, or enzymatic methods that cause changes to the primary, secondary, tertiary, and/or quaternary structures of the proteins. These methods may include denaturing the proteins to change their secondary, tertiary and quaternary structures, and chemically or enzymatically breaking down the protein molecules into smaller fragments. They may also include modifying the pendant moieties of the protein, such as adding additional carboxyl and/or hydroxyl groups to the protein molecules.

One example of a protein used in the invention may be soy protein in the form of a soy flour, soy protein concentrate, soy protein isolate, and/or soy polymer, among other forms of soy protein. Soy flour may be produced by grinding soybeans into a powder. Soy flour may retain the natural oils and other compounds from the soybeans, or may be defatted to produce flour with higher protein content (e.g., about 50 wt % protein or more). Soy protein concentrate contains about 70 wt % soy protein and is made by removing water soluble carbohydrates from defatted soy flour. Soy protein isolate is a highly refined, purified form of soy protein with the protein content of about 90 wt. % or more. The isolates may be made from defatted soy flour that has most non-protein soybean components removed (e.g., fats, carbohydrates, etc.). Soy polymers may include soy proteins that have been chemically modified to impart a variety of functionalities to protein molecules.

The soy protein may be denatured/modified to unfold protein molecules in the dispersion. Upon unfolding, the functionalities of protein molecules (e.g., carboxyl, hydroxyl, and amine) are exposed and may actively react with other binder ingredients to form crosslinking bonds. Examples of protein denaturation and modification methods include, but not limited to, heat treatment, treatment with chaotropic agents (e.g., urea, guanidinium chloride, and lithium perchlorate), acids, bases, metal salts, alcohols, detergents, thiols, sulfites, and mixtures thereof.

The soy protein may also be modified to reduce the viscosity of soy protein dispersion, therefore reducing the viscosity of protein-based thermoset binder compositions. Examples of methods of reducing the viscosity of soy protein dispersion include, but not limited to, hydrolyzing protein using enzymes or alkalis, cleaving disulfide bonds in protein by thiols or sulfites. For example, the viscosity of soy protein dispersion may be reduced by the treatment with sodium bisulfite.

The relative amount of protein to add can vary depending on other binder components used, the processing conditions, and the type of end product being made, among other considerations. Embodiments have the concentration of the protein (as a percentage weight of the binder composition) ranging from about 5% to about 95%; about 10% to about 90%; about 25% to about 80%; about 20% to about 60%; about 20% to about 50%; about 30% to about 70%; etc.

Soy protein such as soy flour may be dispersed or dissolved in water. Other binder ingredients, such as the crosslinking compounds (e.g., monomer and polymer compounds, crosslinking agents, etc.), are mixed with the aqueous soy protein dispersion or solution to form the final binder composition that is applied to the fibrous products.

The crosslinkable combination of crosslinking compounds may include monomeric compounds and/or polymer compounds, among other classes of crosslinking compounds. These crosslinking compounds may be selected to have complementary functional groups that can react to form covalent bonds. For example, one crosslinking compound may be a carboxyl-containing polycarboxy polymer, while a second crosslinking compound may be crosslinking agent that includes hydroxyl groups that react to form covalent bonds with the carboxyl groups. Similarly, the polymer compound may have reactive hydroxyl groups and the crosslinking agent may have reactive carboxyl groups that react to form covalent bonds.

Examples of carboxyl-containing polymer compounds include polycarboxy homopolymers and/or copolymers prepared from ethylenically unsaturated carboxylic acids including, but not limited to, acrylic acid, methacrylic acid, butenedioic acid (i.e., maleic acid and/or fumaric acid), methyl maleic acid, itaconic acid, and crotonic acid, among other carboxylic acids. The polycarboxy polymer may also be prepared from ethylenically unsaturated acid anhydrides including, but not limited to, maleic anhydride, acrylic anhydride, methacrylic anhydride, itaconic anhydride, among other acid anhydrides. Additionally, the polycarboxy polymer of the present invention may be a copolymer of one or more of the aforementioned unsaturated carboxylic acids or acid anhydrides and one or more vinyl compounds including, but not limited to, styrenes, acrylates, methacrylates, acrylonitriles, methacrylonitriles, among other compounds. More specific examples of the polycarboxy polymer may include copolymers of styrene and maleic anhydride, and its derivatives including its reaction products with ammonia and/or amines. For example, the polycarboxy polymer may be the polyamic acid formed by the reaction between the copolymer of styrene and maleic anhydride and ammonia.

The polymer compound may be a solution polymer that helps make a rigid thermoplastic binder when cured. In contrast, when the polymer compound is an emulsion polymer, the final binder compositions are usually less rigid (i.e., more flexible) at room temperature.

Crosslinking agents may include compounds containing at least two reactive functional groups including, but not limited to, hydroxyl, carboxyl, amine, aldehydes, isocynate, and epoxide, among other functional groups. Examples of crosslinking agents may include polyols, alkanol amines, polycarboxylic acids, polyamines, and other types of compounds with at least two functional groups that can undergo crosslinking of with other binder ingredients, such as proteins and polymer compounds.

Specific examples of polyols may include glycerol, ethylene glycol, propylene glycol, diethylene glycol, and triethylene glycol, among other polyols. Specific examples of alkanol amines may include ethanolamine, diethanolamine, and triethanolamine, among other alkanol amines. Specific examples of polycarboxylic acids may include malonic acid, succinic acid, glutaric acid, citric acid, propane-1,2,3-tricarboxylic acid, butane-1,2,3,4-tetracarboxylic acid, among other polycarboxylic acids. Specific examples of polyamines may include ethylene diamine, hexane diamine, and triethylene diamine, among other polyamines. Specific examples of epoxies may include bisphenol-A based epoxies, aliphatic epoxies, epoxidized oils, among other epoxy compounds.

The crosslinking agent may react with both the polymer compound and the protein. For example, when the polymer compound is a polycarboxy polymer the crosslinking agent may be a polyol that is capable of reacting with not only the protein (e.g., soy protein) but also the polycarboxy polymer.

As noted above, the binder compositions may include three components binders made from a single protein and a two-compound crosslinking combination. In addition, binder compositions may include a plurality of proteins and compounds that make up the crosslinking combination (e.g., a plurality of polymer compounds, and/or crosslinking agents). For example, two or more types of one component may be combined with a single species of each of the other components. In addition, two or more type of two of the components may be combined with a single species of a third component. Also, two or more types of all three components may be present in the binder composition.

The binder compositions may also optionally include a cure catalyst. Examples of cure catalysts may include phosphorous-containing compounds such as phosphorous oxyacids and their salts. For example, the cure catalyst may be an alkali metal hypophosphite salt like sodium hypophosphite (SHP). The cure catalyst may be added to expedite curing of the binder composition.

The binder compositions may also optionally include extenders. Examples of extenders may include starch, lignin, rosin, among other extenders.

The binder compositions may also optionally contain pH adjustment agents. For example, the present binder compositions and solution may include one or more bases that maintain the pH at about 7 or more, about 8 or more, about 9 or more, about 9.5 or more, about 10 or more, about 10.5 or more, etc.

The protein in the binder composition may be actively crosslinkable with the members of the crosslinking combination. The protein may be treated to expose the reactive moieties on polypeptide chains of the proteins (e.g., hydroxyl groups, carboxyl groups, amino groups, thiol groups) for crosslinking reactions. For example, the hydroxyl-containing amino acid moiety on protein chains (e.g., serine, tyrosine, threonine) may react in an esterification reaction with a carboxyl group on the polycarboxy polymer. Similarly, a carboxyl-containing amino acid moiety (e.g., aspartic acid, glutamic acid) may react with a hydroxyl on the crosslinking agent to actively crosslink the protein in the binder composition.

While not wishing to be bound by a particular theory, it is thought that the reactions between reactive moieties on the protein, and the compounds of the crosslinking combination provide crosslinking between these compounds to create a rigid thermoset binder when cured.

The present binder compositions may also exclude materials that have deleterious effects on the cured binder. For example, the binder compositions may have decreased levels of reducing sugars (or no reducing sugars at all) to reduce or eliminate Maillard browning that results from the reaction of these sugars at elevated temperatures. Some binder compositions made from renewable materials can contain substantial levels of reducing sugars and other carbohydrates that produce a brown or black color in the cured binder. As a result, products made with these binder compositions are difficult or impossible to dye.

Examples of the present binder compositions include compositions where the concentration of reducing sugars is decreased to a point where discoloration effects from Maillard browning are negligible. The fully cured binders may have a white or off-white appearance that allows them to be easily dyed during or after the curing process.

Methods of Making Fiber Products

The present binder compositions may be used in methods of making fiber products. The methods may include applying a solution of the binder composition to fibers and curing the binder composition on the fibers to form the fiber product. The binder solution may be spray coated, spin coated, curtain coated, knife coated, or dip coated onto fibers. Once the liquid binder composition is applied, the binder and substrate may be heated to cure the binder composition and form a composite of cured binder and fibers that make up the fiber product.

The binder solution may be formed to have a viscosity in range that permits the efficient application of the solution to the fibers. For example, the viscosity may be about 1 centipoises to about 1000 centipoises when the binder solution is at room temperature.

If the viscosity of the liquid binder applied to the substrate is too high, it may slow down the application process both at the release point for the binder as well as the rate of mixing and coverage of the binder on the substrate. Solutions and dispersions of many types of protein, including some types of soy protein in aqueous solutions, have generally high viscosities. Thus, the present protein-containing binder compositions may include proteins with a relatively low viscosity when dissolved/dispersed in the liquid binder. These may include soy proteins that are modified to lower the viscosity of soy protein dispersion.

After application of the liquid binder composition on the substrate, the amalgam of liquid binder and substrate undergoes curing. In the curing process the protein, polymer compound, and crosslinking agent may form covalently crosslinked bonds among each other to convert the amalgam into a thermoset composite. When a thermal curing process is used, the amalgam may be subjected to an elevated temperature (e.g., up to 300° C.) to facilitate crosslinking in the binder. The peak curing temperature may depend on the specific formulation of the protein-containing binder composition, the substrate, and whether a cure catalyst is used. The cured material typically includes about 0.5 wt % to about 50 wt % thermoset binder composition (e.g., about 1 wt. % to about 10 wt. %) with the substrate representing most of the remaining weight.

The binder composition may be a stable one-part composition that can be recycled during the application to the fibers and/or between applications on fibers. Thus, an unused portion of the binder solution that, for example, passes through the fibers may be captured and sent back to the supply of binder solution applied to the fibers. In some embodiments, the unused portion of the binder solution may be purified or otherwise treated before returning to the supply.

The reuse of the binder solution may not only reduce the amount of solution used, it may also reduce the amount of waste materials that must be treated and discarded. However, recycling unused binder solution requires that the solution remain stable for two or more application cycles. In many instances, two-part binder compositions that mix separated and highly reactive components immediately before their application will cure too rapidly to be recycled. One-part binder compositions may also be unsuitable if they don't have a sufficient pot life to remain relatively unreacted prior to use and during recycling. The present binder compositions include one-part binder compositions that are stable enough to be appropriate for binder solution recycling.

Fiber Products

The present binder compositions may be added to fibers to produce composite fiber products. The fibers may include organic fibers and/or inorganic fibers. For examples of the fibers may include polymer fibers and/or glass fibers, among other types of fibers. The fibers may be arranged as an insulation batt, woven mat, non-woven mat, or spunbond product, among other types of fiber substrate.

The present binder compositions may be used in fiber products to make insulation and fiber-reinforced composites, among other products. The products may include fibers (e.g., organic and/or inorganic fibers) contained in a cured thermoset binder prepared from a one-part binder solution of a polymer compound, crosslinking agent that is crosslinkable with the polymer compound, and protein crosslinkable with both the polymer compound and crosslinking agent. The fibers may include glass fibers, carbon fibers, and organic polymer fibers, among other types of fibers. For example, the combination of the binder composition and glass fibers may be used to make fiberglass insulation products. Alternatively, when the fiberglass is a microglass-based substrate, the binder may be applied and cured to form printed circuit boards, battery separators, filter stock, and reinforcement scrim, among other articles.

The binder compositions may be formulated to impart a particular color to the fiber product when cured. For example, the concentration of reducing sugars in the binder compositions may be lowered to give the fiber product a white or off-white color when cured. Alternatively, a dye may be added to binder composition before, during, or after the curing stage to impart a particular color to the final fiber product (e.g., red, pink, orange, yellow, green, blue, indigo, violet, among may other colors).

EXPERIMENTAL

The following Examples are presented to provide specific representative embodiments of the present invention. It should be understood, however, that the invention is not limited to the specific details as set forth in these Examples.

Example #1

Modification of Soy Flour 50 grams of defatted soy flour (Prolia 200/90, Cargill) is dispersed in 200 ml of DI water at room temperature. 0.5 grams of sodium bisulfite is then added to the soy flour dispersion. The viscosity of the soy flour dispersion drops shortly after the addition of the sodium bisulfite. The final soy flour dispersion has a solids concentration of 18.9% by oven method (drying at 125° C. for 2 hours).

Example #2

Modification of Soy Flour 50 grams of defatted soy flour (Prolia 200/90, Cargill) is dispersed in 200 ml of DI water at room temperature. 0.5 grams of sodium bisulfite is then added to the soy flour dispersion. After the viscosity of the soy flour dispersion is decreased to a stable region, the pH of the dispersion is adjusted to 11 using an ammonium hydroxide solution (25-30%). The final soy flour dispersion has a solids concentration of 17.5% by oven method.

Example #3

Preparation of Polyamic Acid Resin (SMAc-TEA)

To a flask equipped with a reflux condenser is added 1,735 grams of water and 234 grams of 30% by weight aqueous solution of ammonia. To this solution is added 960 grams of a copolymer of styrene and maleic anhydride (SMA) having a molecular weight of approximately 2,000 and an acid number of 480. The mixture is then heated to 90° C. and maintained at 90° C. under constant stirring until a clear solution of polyamic acid is obtained. To the obtained polyamic acid solution is added 306 grams of triethanolamine. The final polyamic acid resin, hereinafter referred to as SMAc-TEA, has a solids of 42.4% and a pH of 6.8.

Example #4

Preparation of a Binder Composition of Modified Soy Flour and SMAc-TEA

To 79.4 grams of the soy flour dispersion of Example 1 is added with stirring 23.6 grams of the polyamic acid resin of Example 3, and 22 grams of water to achieve a total solids of 20% and a weight ratio between soy flour and SMAc-TEA of 60/40. The final binder composition is then used for dogbone composite tensile test as described below in Example 8.

Example #5

Preparation of a Binder Composition of Modified Soy Flour and SMAc-TEA

To 85.7 grams of the soy flour dispersion of Example 2 is added with stirring 23.6 grams of polyamic acid resin of Example 3 and 15.7 grams of water to achieve a total solids of 20% and a weight ratio between soy flour and SMAc-TEA of 60/40. The final binder composition is then used for dogbone composite tensile test as described below in Example 8.

Example #6

Preparation of a Binder Composition of Modified Soy Flour and SMAc-TEA

To 57.1 grams of the soy flour dispersion of Example 2 is added with stirring 35.4 grams of polyamic acid resin of Example 3 and 32.5 grams of water to achieve a total solids of 20% and a weight ratio between soy flour and SMAc-TEA of 40/60. The final binder composition was then used for dogbone composite tensile test as described below in Example 8.

Example #7

Preparation of a Binder Composition of Modified Soy Flour and SMAc-TEA

To 28.6 grams of the soy flour dispersion of Example 2 is added with stirring 47.2 grams of polyamic acid resin of Example 3 and 49.2 grams of water to achieve a total solids of 20% and a weight ratio between soy flour and SMAc-TEA of 20/80. The final binder composition is then used for dogbone composite tensile test, which is described below in Example 8.

Example #8

Dogbone Composite Tensile Test

The four soy flour-containing binder compositions of Examples 4-7 and SMAc-TEA resin of Example 3 are evaluated via a dogbone tensile test method. Binder solutions are prepared from the five binder compositions by adding 5%, by weight, of sodium hypophosphite monohydrate and 1%, by weight, of aminosilane (Silquest A-1100). The binder solutions are mixed with glass beads to achieve a binder content of 2.4% for each composite of binder and glass beads. The composites are then pressed in molds of dogbone shape to form test samples. The molded samples are then dried and cured in an oven at 204° C. for 20 minutes.

Tensile tests are conducted on the dogbone composite samples before and after humid aging. The aging process involves exposing the dogbone samples containing the cured binder to air at a temperature of 120° F., with 95% relative humidity for 24 hours. FIG. 1 shows the tensile strength results for the five binder compositions described in Examples 3-7 before and after humid aging. In FIG. 1, "SF" stands for "soy flour". The data shown in FIG. 1 represent the average of nine dogbone specimens for each sample and the error represents the standard deviation.

The tensile tests show that the binder compositions with soy flour that is not ammonia-modified yield a lower tensile strength, as compared to the binder composition without soy flour (e.g., SMAc-TEA). Significant increase in tensile strength was observed when soy flour was ammonia-modified. As shown in FIG. 1, all binder compositions containing ammonia-modified soy flour show higher tensile strength than the binder composition without soy flour (e.g., SMAc-TEA). The humid-aging retention of tensile strength of all the binder compositions containing ammonia-modified soy flour is very high (>95%), indicating the high moisture resistance of the protein-based binder compositions of the present invention.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the protein" includes reference to one or more proteins and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A one-part binder composition comprising:
a protein dispersed in a crosslinking solution, wherein the crosslinking solution is a solution that at least includes:
a first crosslinking compound and a second crosslinking compound, wherein:
the first and second crosslinking compounds are individually crosslinkable with each other and with the protein, and
the one-part binder composition does not include an emulsion polymer.

2. The one-part binder composition of claim 1, wherein the first crosslinking compound comprises a polymer compound, and the second crosslinking compound comprises a crosslinking agent.

3. The one-part binder composition of claim 2, wherein the polymer compound comprises a carboxyl-containing polycarboxy polymer and the crosslinking agent comprises at least one hydroxyl group.

4. The one-part binder composition of claim 2, wherein the polymer compound comprises a hydroxyl-containing polyhydroxy polymer and the crosslinking agent comprises at least one carboxyl group.

5. The one-part binder composition of claim 2, wherein the polymer compound comprises a solution polymer.

6. A fiber product comprising:
inorganic or organic fibers and a cured thermoset binder prepared from a one-part binder solution comprising an aqueous mixture of:
a protein; and
an aqueous solution comprising at least a first crosslinking compound comprising a solution polymer compound of styrene and maleic anhydride and a second crosslinking compound comprising a crosslinking agent of a polyol, wherein the first and second crosslinking compounds are individually crosslinkable with each other and with the protein, and wherein the aqueous solution does not include an emulsion of the first crosslinking compound or the second crosslinking compound.

7. The fiber product of claim 6, wherein the inorganic or organic fibers comprise glass fibers.

8. The fiber product of claim 6, wherein the protein comprises soy flour.

9. The fiber product of claim 6, wherein the fiber product is selected from the group consisting of an insulation batt, a woven fiberglass mat, a non-woven fiberglass mat, and a spunbond product.

10. The fiber product of claim 6, wherein the cured binder has a white or off-white color.

11. The fiber product of claim 6, wherein cured binder further comprises a dye or pigment that gives the fiber product a predetermined color.

12. A method of making a fiber product, the method comprising:
providing fibers comprising organic fibers or inorganic fibers;
applying a one-part binder solution to the fibers, wherein the one-part binder solution comprises an aqueous mixture of:
a protein; and
an aqueous solution comprising at least a first crosslinking compound comprising a solution polymer compound of styrene and maleic anhydride and a second crosslinking compound comprising a crosslinking agent of a polyol, wherein the first and second crosslinking compounds are individually crosslinkable with each other and with the protein, and wherein the aqueous solution does not include an emulsion of the first crosslinking compound or the second crosslinking compound; and
reusing an unused portion of the one-part binder solution in a subsequent application of the one-part binder solution to the same fibers or a different group of fibers.

13. The method of claim 12, wherein the one-part binder solution has a shelf life of at least one month.

14. The method of claim 12, wherein the one-part binder solution has a viscosity of about 1 cps to about 1000 cps.

15. The method of claim 12, wherein the protein comprises soy flour.

16. The method of claim 12, wherein the step of applying the one-part binder solution to the fiber comprises curtain coating or spray coating the binder solution on the fibers.

17. The method of claim 12, wherein the one-part binder solution further comprises a dye or pigment to give the fiber product a predetermined color.

18. The one-part binder composition of claim 2, wherein the crosslinking agent comprises a polyol, an alkanol amine, or a polyamine.

19. The one-part binder composition of claim 2, wherein the protein comprises soy protein.

20. The one-part binder composition of claim 19, wherein the soy protein comprises soy flour, soy protein concentrate, soy protein isolate, or soy polymer.

* * * * *